US012333220B2

(12) United States Patent
Suto et al.

(10) Patent No.: US 12,333,220 B2
(45) Date of Patent: Jun. 17, 2025

(54) USAGE-PATTERN-BASED GENERATION OF DIGITAL PRODUCT MODEL

(71) Applicant: INTERNATIONAL BUSINESS MACHINES CORPORATION, Armonk, NY (US)

(72) Inventors: Tiberiu Suto, Franklin, NY (US); Martin G. Keen, Cary, NC (US); Jeremy R. Fox, Georgetown, TX (US); Sarbajit K. Rakshit, Kolkata (IN)

(73) Assignee: INTERNATIONAL BUSINESS MACHINES CORPORATION, Amork, NY (US)

( * ) Notice: Subject to any disclaimer, the term of this patent is extended or adjusted under 35 U.S.C. 154(b) by 273 days.

(21) Appl. No.: 18/177,175

(22) Filed: Mar. 2, 2023

(65) Prior Publication Data
US 2024/0296258 A1    Sep. 5, 2024

(51) Int. Cl.
G06F 30/17     (2020.01)
G06F 30/27     (2020.01)
G06F 111/18    (2020.01)

(52) U.S. Cl.
CPC ............ G06F 30/17 (2020.01); G06F 30/27 (2020.01); G06F 2111/18 (2020.01)

(58) Field of Classification Search
CPC .......... G06F 30/17; G06F 30/27; G06F 3/011; G06F 3/012; G06F 3/016; G06F 3/017;
(Continued)

(56) References Cited

U.S. PATENT DOCUMENTS 10,248,993 B2    4/2019    Almog et al.
10,339,592 B2    7/2019    Crow
(Continued)

FOREIGN PATENT DOCUMENTS

CN      111967534 A      11/2020
WO   WO 202282740 A1     4/2022

OTHER PUBLICATIONS

Bellissimo, Jay, "Intelligent Workflows 101: Revolutionizing the Way Your Business Works", IBM Smarter Business Review, published online Apr. 29, 2019, https://www.ibm.com/blogs/services/2019/04/29/intelligent-workflows-101-revolutionizing-the-way-your-business-works/ (5 pages) (Year: 2019).

(Continued)

Primary Examiner — Vijay Shankar
(74) Attorney, Agent, or Firm — Elliot J. Shine, Esq.; Kevin P. Radigan, Esq.; Heslin Rothenberg Farley & Mesiti P.C.

(57) ABSTRACT

A process is provided for usage-pattern-based generation of a digital model of a product. The process includes obtaining a usage pattern of a user of a product, where the usage pattern includes a set of usage pattern parameters. In addition, the process includes using a machine learning model of an artificial intelligence system to generate a 3-D virtual image of the product aligned with the usage pattern, and analyzing, by the artificial intelligence system, the 3-D virtual image of the product to facilitate identifying a requirement specification for the product based on the usage pattern. Further, the process includes generating a digital model of a new product for the user based on the identified requirement specification.

20 Claims, 7 Drawing Sheets

(58) Field of Classification Search
CPC .............. G06F 2111/18; G06T 5/60; G06T 2207/20084
See application file for complete search history.

(56) References Cited

U.S. PATENT DOCUMENTS

| | | | |
|---|---|---|---|
| 10,395,392 B1 | 8/2019 | Kim et al. | |
| 10,540,578 B2 | 1/2020 | Madani et al. | |
| 10,678,855 B2 | 6/2020 | Vaughn et al. | |
| 10,949,914 B2 | 3/2021 | Bajpai et al. | |
| 10,964,078 B2 | 3/2021 | Wiesel et al. | |
| 11,195,340 B2* | 12/2021 | Devam | G06V 20/20 |
| 11,644,899 B2* | 5/2023 | Lock | G06F 3/015 345/156 |
| 2021/0279790 A1 | 9/2021 | Banipal | |
| 2021/0327144 A1* | 10/2021 | Devam | G06F 3/011 |
| 2022/0342482 A1* | 10/2022 | Lock | G06T 13/80 |
| 2022/0414909 A1* | 12/2022 | Kim | G06N 3/08 |

OTHER PUBLICATIONS

Huang et al., "On GANs, NLP and Architecture: Combining Human and Machine Intelligences for the Generation and Evaluation of Meaningful Designs", Technology Architecture & Design, vol. 5, No. 2, pp. 207-224 (Year: 2021).
Hallowell et al., "Automated Extraction of Weather Variables from Camera Imagery", Proceedings of the 2005 Mid-Continent Transportation Research Symposium, Ames, Iowa, Aug. 2005, 12 pages.
IBM, "Automate digital workflows on premises or on cloud", IBM Business Automation Workflow, May 1, 2025, 08 pages.
IBM, "Think Tech news, education and events", May 1, 2025, 25 pages, https://www.ibm.com/think.

* cited by examiner

USAGE-PATTERN-BASED GENERATION OF DIGITAL PRODUCT MODEL

BACKGROUND

One or more aspects relate, in general, to enhancing processing within a computing environment, such as a product development computing environment, and in particular to usage-pattern-based digital modeling of a product to facilitate customized product design, selection and/or fabrication.

Today, businesses and customers alike recognize the importance of efficiency and sustainability at all levels of product design, manufacture and life cycle.

Digital modeling is a design and production process that utilizes 3-D modeling of a product, which can assist a developer with product development, and can be used in association with a variety of technologies to physically produce a desired product from a model of the product. For enhanced efficiency and sustainability, further improvements to such product development processes would be advantageous.

SUMMARY

Certain shortcomings of the prior art are overcome, and additional advantages are provided herein through the provision of a computer-implemented method of facilitating processing within a computing environment. The computer-implemented method includes: obtaining a usage pattern of a user of a product, where the usage pattern includes a set of usage pattern parameters. Further, the method includes using a machine learning model of an artificial intelligence system to generate a 3-D virtual image of the product aligned with the usage pattern, and analyzing, by the artificial intelligence system, the 3-D virtual image of the product to facilitate identifying a requirement specification for the product based on the usage pattern. In addition, the method includes generating, by the artificial intelligence system, a digital model of a new product for the user based on the identified requirement specification. Advantageously, improved product development processing within a computing environment is provided. The improved processing includes a process for usage-pattern-based generation of a digital model which facilitates customized product development optimized to a particular user's usage pattern of the product. The customized development promotes user satisfaction with the product, as well as sustainability by designing, and selecting or fabricating, the product to best meet the user's usage pattern.

In one implementation, obtaining the usage pattern of the user of the product includes determining the usage pattern of the user of a virtual product representative of the product, where the determining is based on data from one or more electronic devices, the data being representative of user movement of the virtual product, and the usage pattern including, for example, relative movement of different 3-D points of the virtual product. Advantageously, determining the usage pattern of a user of a virtual product representative of the product is a cost effective and efficient approach to providing the artificial intelligence system with the user's usage pattern.

In one example, the machine learning model is a generative adversarial network. Advantageously, the use of generative adversarial network-based 3-D virtual image rendering facilitates obtaining a high-fidelity virtual product, which assists with identifying the requirement specification for the product based on the usage pattern.

In one implementation, the 3-D virtual image of the product aligned with the usage pattern generated by the machine learning model of the artificial intelligence system is one 3-D virtual image of a sequence of 3-D virtual images of the product aligned with the usage pattern that are generated by the machine learning model of the artificial intelligence system, and the analyzing includes analyzing, by the artificial intelligence system, the sequence of 3-D virtual images of the product to facilitate identifying the requirement specification for the product based on the usage pattern. Advantageously, obtaining a sequence of 3-D virtual images of the product aligned with the usage pattern, which are generated by the machine learning model of the artificial intelligence system, assists the artificial intelligence system in analyzing the user's usage pattern input to facilitate identifying the requirement specification for the product based on the usage pattern.

In one embodiment, identifying the requirement specification for the product based on the usage pattern includes identifying, by the artificial intelligence system, product data representing one or more relevant parameters of a shape and dimensions of the product, and how the shape and dimensions of the product change during use by the user. In one example, identifying the requirement specification for the product based on the usage pattern further includes identifying, by the artificial intelligence system, one or more materials to be used in manufacture of the new product based on a rate of change in the shape and dimensions of the product during use by the user. Advantageously, through analyzing the 3-D virtual image of the product, the artificial intelligence system identifies a requirement specification for the product based on the usage pattern, where the requirement specification can include multiple product parameters, including, for instance, product shape and dimension, and how shape and dimension change during usage of the product. Based on the requirement specification, the artificial intelligence system can identify appropriate materials, for instance, from a knowledge corpus, to be used for manufacturing a new product, or modifying an existing product that meets the user's usage pattern for the product.

In one implementation, the computer-implemented method further includes providing the digital model of the new product to a virtual display interface for display to the user as a virtual new product. Advantageously, display of the virtual new product to the user by a virtual display interface enhances the artificial intelligence system experience for the user by allowing the user to visualize the final product before fabrication.

In one implementation, the set of usage pattern parameters includes parameters for: force applied on the product during use; one or more time periods of movement of the product during use; product dimension changes during use; and product orientation changes during use. Advantageously, a variety of usage pattern parameters are obtained by the artificial intelligence system in order to identify an optimum requirement specification for the product for the usage pattern of the user. In one embodiment, electronic devices, such as Internet of Things (IoT) and other sensors can feed data to the artificial intelligence system, such as force applied on the product, time period of usage, etc., which assists the artificial intelligence system in refining the requirement specification for the product based on the user's usage pattern.

In one embodiment, determining the usage pattern of the product for the user includes receiving a user-explanation of how the product is to be used, and parsing, by the artificial intelligence system, the user-explanation to determine the usage pattern for the user of the product. Advantageously, the artificial intelligence system is configured to readily allow the user to provide an explanation of how the product is to be used, which can then be parsed by the artificial intelligence system to determine the usage pattern for the user of the product.

In one embodiment, obtaining the usage pattern of the product for the user includes obtaining and analyzing, by the artificial intelligence system, product-relevant user data from available online data sources to determine the usage pattern of the product for the user. Advantageously, obtaining the usage pattern of the user of the product can be achieved in one or more ways, including by the artificial intelligence system analyzing product-relevant user data from available online data sources.

In one implementation, the generated 3-D virtual image of the product aligned with the usage pattern is a digital twin of a product design that addresses the usage pattern, and which the user can further optimize for use in identifying the requirement specification. Advantageously, a digital twin is a virtual model designed to accurately reflect the physical object. The digital twin is a virtual representation of the product and can be used to simulate use of the product.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
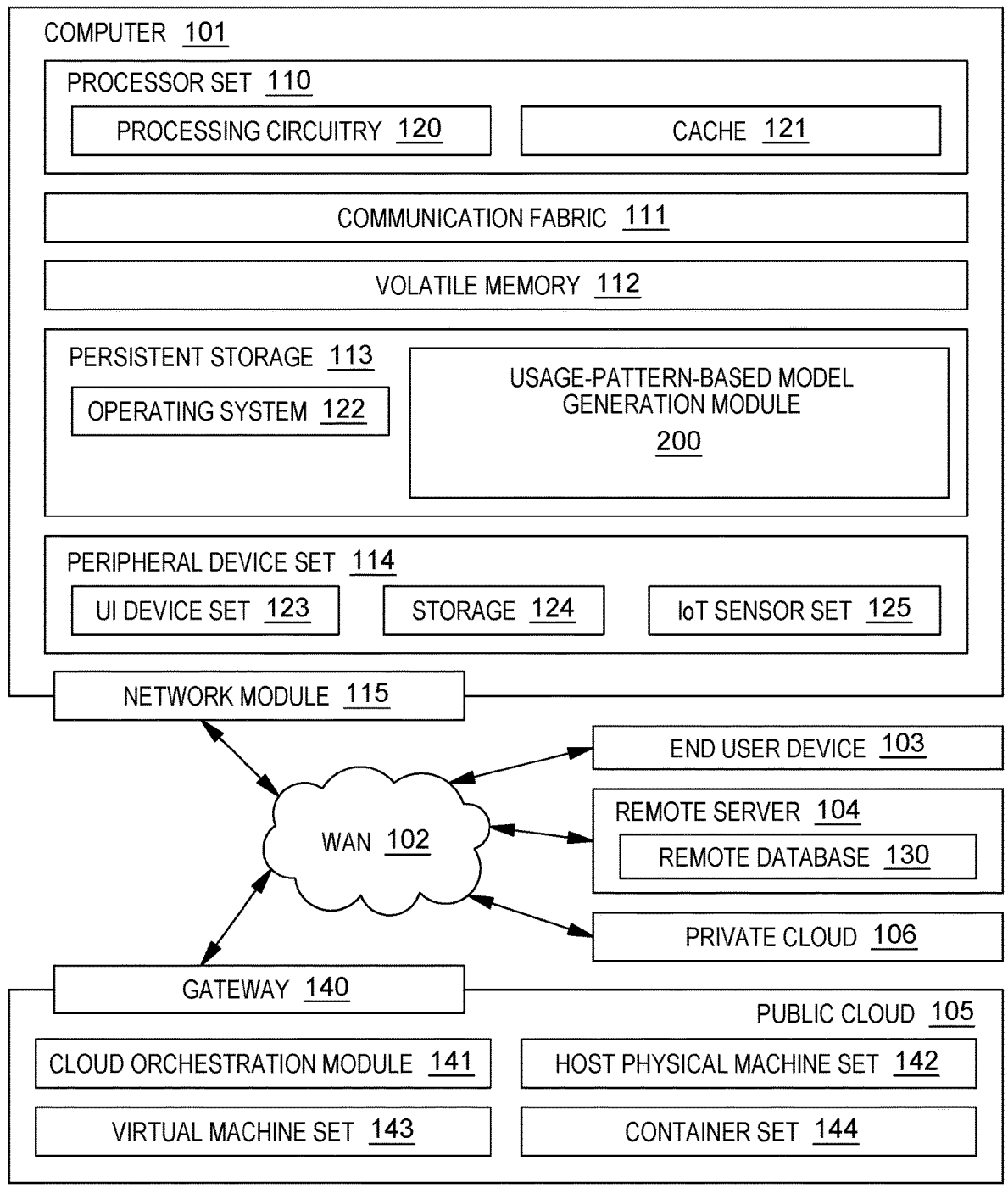
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and usage-pattern-based model generation module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform usage-pattern-based model generation processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as usage-pattern-based model generation module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2:
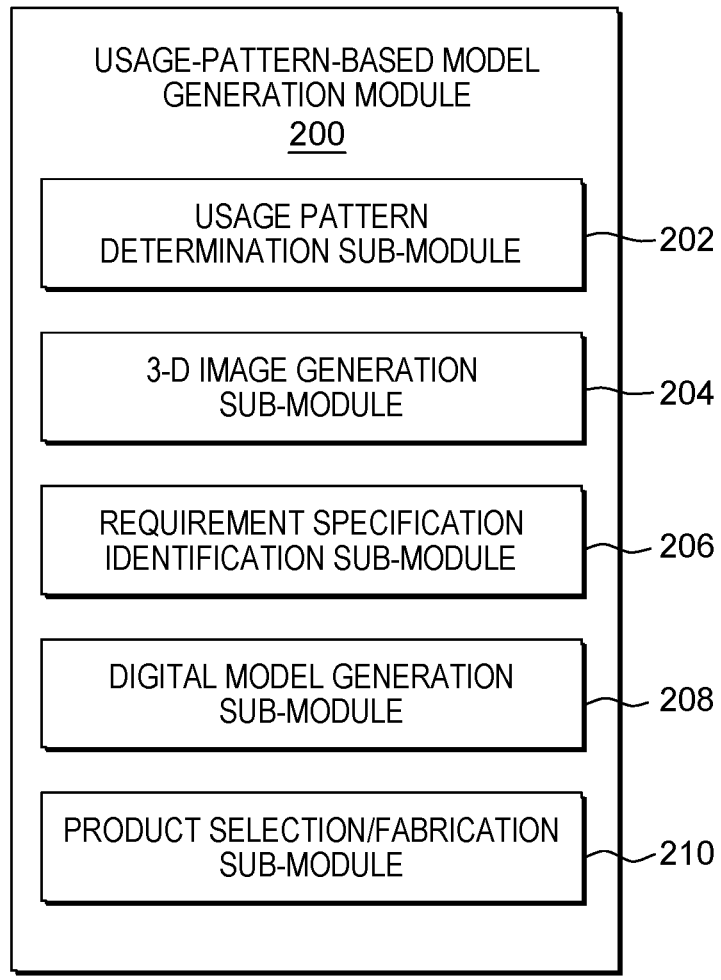
FIG. 2 depicts one embodiment of a computer program product with a usage-pattern-based model generation module, in accordance with one or more aspects of the present invention.
Figure 3:
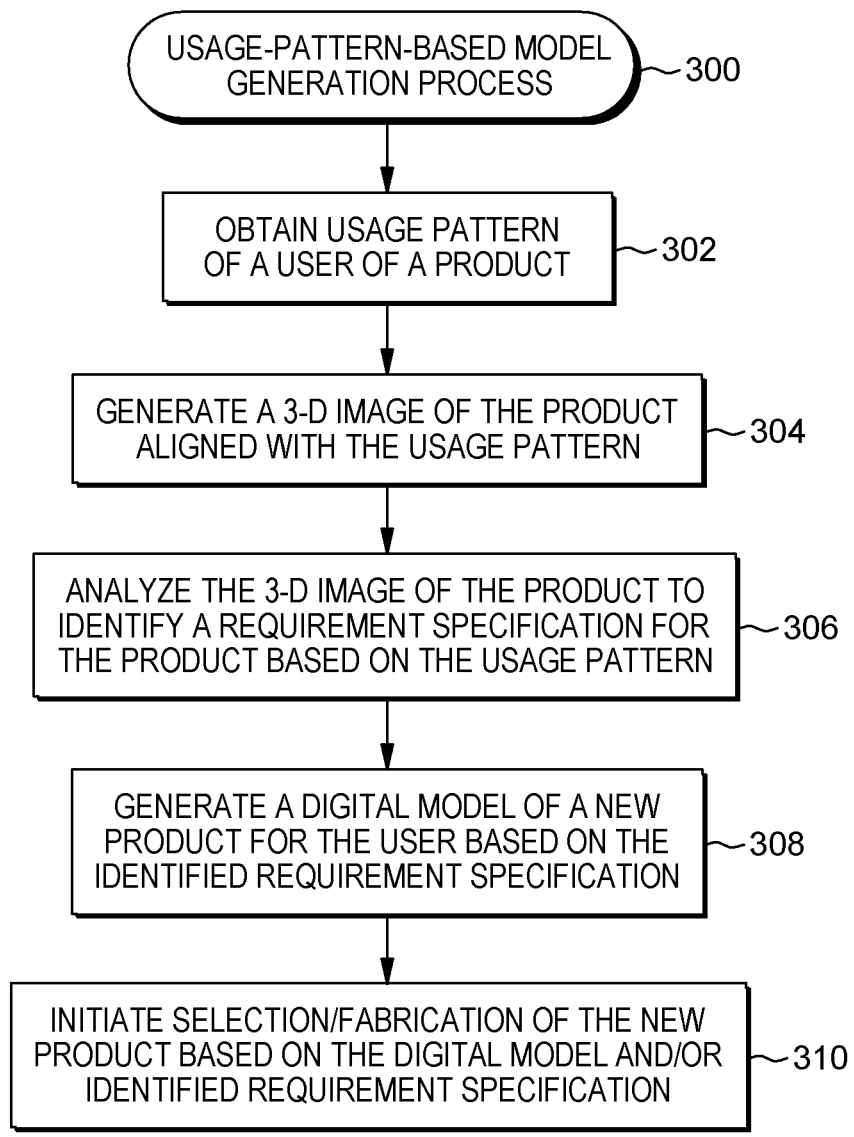
FIG. 3 depicts one embodiment of a usage-pattern-based model generation workflow, in accordance with one or more aspects of the present invention.

By way of example, one or more embodiments of a usage-pattern-based model generation module and process are described initially with reference to FIGS. 2-3. FIG. 2 depicts one embodiment of usage-pattern-based model generation module 200 that includes code or instructions to perform usage-pattern-based model generation processing, in accordance with one or more aspects of the present invention, and FIG. 3 depicts one embodiment of a usage-pattern-based model generation process, in accordance with one or more aspects of the present invention.

Referring to FIGS. 1 & 2, usage-pattern-based model generation module 200 includes, in one example, various sub-modules used to perform processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of usage-pattern-based model generation module 200 include, for instance, a usage-pattern-based determination sub-module 202 to obtain a usage pattern of a user of product, where the usage pattern includes a set of usage pattern parameters; a 3-D image generation sub-module 204 to generate, using a machine learning model of an artificial intelligence system, a 3-D virtual image of the product aligned with the usage pattern; a requirement specification identification sub-module 206 to analyze, by the artificial intelligence system, the 3-D virtual image of the product to facilitate identifying a requirement specification for the product based on the usage pattern; a digital model generation sub-module 208 to generate, by the artificial intelligence system, a digital model of a new product for the user based on the identified requirement specification; and a product selection and/or fabrication sub-module 210 to facilitate selecting or fabricating the new product based on, for instance, the digital model of the new product and/or the identified requirement specification for the product. Advantageously, using usage-pattern-based model generation such as disclosed herein facilitates customizing a product for a user based on the user's own usage pattern, which facilitates customized product selection and/or fabrication. Additionally, the usage-pattern-based model generation module disclosed provides a more efficient and less costly approach to optimizing a product for a particular user, which facilitates sustainability in the product design, manufacture and lifecycle. Note that although various sub-modules are described, usage-pattern-based model generation module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform usage-pattern-based model generation processing. FIG. 3 depicts one example of a model generation process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as usage-pattern-based model generation module 200. In other examples, the code can be included in one or more other modules and/or in one or more sub-modules of the one or more other modules. Various options are available.

As one example, usage-pattern-based model generation process 300 executing on a computer (e.g., computer 101 of FIG. 1), a processor (e.g., a processor of processor set 110 of FIG. 1), and/or processing circuitry (e.g., processing circuitry of processor set 110), obtains a usage pattern of a user of a product 302, where the usage pattern includes a set of usage pattern parameters. In one embodiment, the usage pattern can be used by a machine learning model, such as a generative adversarial network, to generate a 3-D virtual image of the product, where the 3-D virtual image of the product is aligned with the usage pattern 304. In one or more embodiments, the 3-D virtual image of the product can be one 3-D virtual image of a sequence of 3-D virtual images of the product aligned with the usage pattern, which are generated by the machine learning model of the artificial intelligence system.

The usage-pattern-based model generation process 300 further includes analyzing the 3-D virtual image of the product to facilitate identifying a requirement specification for the product based on the usage pattern 306, and generating, by the artificial intelligence system, a digital model of a new product for the user based on identified requirement specification 308.

In one embodiment, usage-pattern-based model generation processing 300 further includes initiating selection or fabrication of the new product based on the digital model and/or identified requirement specification 310. In this manner, the selected or fabricated new product is customized or optimized for the user based on the user's usage pattern for the product.

Recognized herein is that different users can have different types of requirements for a product, with the same product being capable of being used differently by different users. Advantageously, a novel approach is provided herein to obtaining a usage pattern of a product for a particular user, where the usage pattern can be obtained in a variety of ways, depending on the implementation. By customizing design of a product to a user's usage pattern, one or more aspects of the product can vary between users. For instance, based on the usage patterns, a manufacturer can select appropriate materials, product configurations, product capabilities, etc., for each product being developed.

Usage pattern determination for a user of a product, and the artificial intelligence workflow disclosed herein supporting it, can advantageously be used to customize the product to the particular user. Based on usage pattern, product shape, dimension, design, etc., can be varied. Different usage patterns can cause different types of forces on the product in use, for instance, from different sides of the product, and hence shape and dimension of the product can be optimized for each user. Further, selection of materials will also change between usage patterns. In one embodiment, the usage-pattern-based model generation processing disclosed herein represents an intelligent workflow amelioration of existing activities to support a product genesis, lifecycle, and final sunset.

Figure 4:
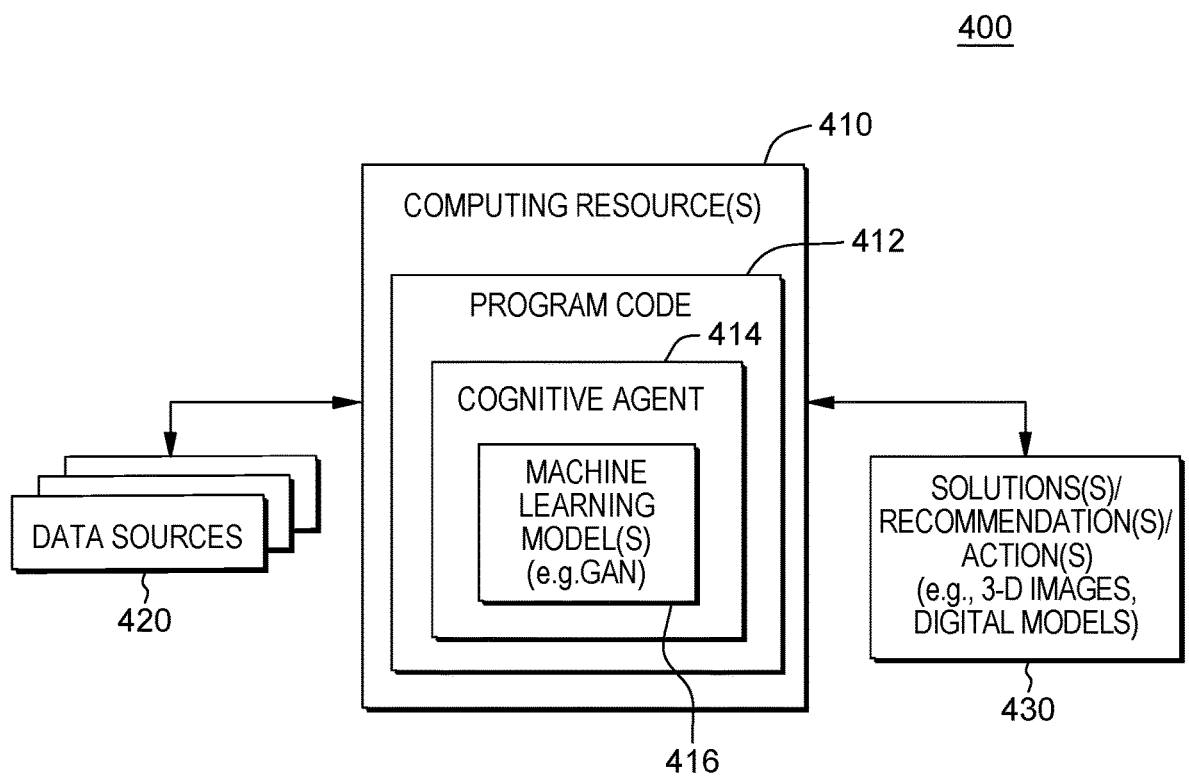
FIG. 4 is a further example of a computing environment to include and/or use one or more aspects of the present invention.

By way of further explanation, FIG. 4 depicts another embodiment of a computing environment or system 400, which can incorporate, or implement, one or more aspects of an embodiment of the present invention. In one or more implementations, system 400 is implemented as part of a computing environment, such as computing environment 100 described above in connection with FIG. 1. System 400 includes one or more computing resources 410 that execute program code 412 that implements, for instance, one or more aspects of a module or facility such as disclosed herein, and which includes a cognitive engine or agent 414, which utilizes one or more machine learning models 416, such as described herein. Data, such as usage-pattern-related data, knowledge corpus database data, or other data associated with generating a model of a new product in accordance with one or more aspects disclosed herein, is used by cognitive agent 414, to train model(s) 416 to (for instance), generate one or more 3-D virtual images of a product aligned with a usage pattern of a user of the product, and/or generate a digital model of a new product for the user based on the identified requirement specification, and/or other related actions 430, etc., based on the particular application of the machine-learning model(s) to facilitate achieving the usage-pattern-based model generation workflow disclosed. In implementation, system 400 can include, or utilize, one or more networks for interfacing various aspects of computing resource(s) 410, as well as one or more data sources 420 providing data, and one or more components, systems, etc., receiving an output, action, etc., 430 of machine learning model(s) 416 to facilitate performance of one or more artificial intelligence system operations. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and an output solution, recommendation, action, of the machine-learning model(s), such as discussed herein.

In one or more implementations, computing resource(s) 410 house and/or execute program code 412 configured to perform methods in accordance with one or more aspects of the present invention. By way of example, computing resource(s) 410 can be a computing-system-implemented resource(s). Further, for illustrative purposes only, computing resource(s) 410 in FIG. 4 is depicted as being a single computing resource. This is a non-limiting example of an implementation. In one or more other implementations, computing resource(s) 410, by which one or more aspects of processing, such as discussed herein can, at least in part, be implemented in multiple separate computing resources or systems, such as one or more computing resources of a cloud-hosting environment, by way of example.

Briefly described, in one embodiment, computing resource(s) 410 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed are described further herein with reference to the figures.

In one embodiment, program code 412 executes a cognitive engine or agent 414 which includes and trains one or more models 416. The models can be trained using training data that can include a variety of types of data, depending on the model and the data sources. In one or more embodiments, program code 412 executing on one or more computing resources 410 applies one or more algorithms of cognitive agent 414 to generate and train the model(s), which the program code then utilizes to determine a change value for self-tuning or adaptively adjusting, for instance, a 3-D virtual image of a product aligned with a usage pattern of a user of the product and/or a digital model of a new product for the user based on the identified requirement specification for the user, and depending on the application, to perform an action (e.g., select an existing product closest to the new product represented by the generated digital model, initiate fabrication of the new product using, for instance, the generated digital model of the new product and/or the identified requirement specification for the product, etc.). In an initialization or learning stage, program code 412 trains one or more machine learning models 416 using obtained training data that can include, in one or more embodiments, one or more usage pattern parameters, or other data to be used by the artificial intelligence system workflow to, for instance, generate a 3-D virtual image of a product aligned with a user's usage pattern, and/or generate a digital image of a new product for the user based on the identified requirement specification for the user, etc., such as described herein.

Data used to train the models (in one or more embodiments of the present invention) can include a variety of types of data, such as heterogeneous data generated by one or more data sources and/or data stored in one or more databases accessible by, the computing resource(s). Program code, in embodiments of the present invention, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 416, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present invention, the program code can utilize one or more neural networks to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

Figure 5:
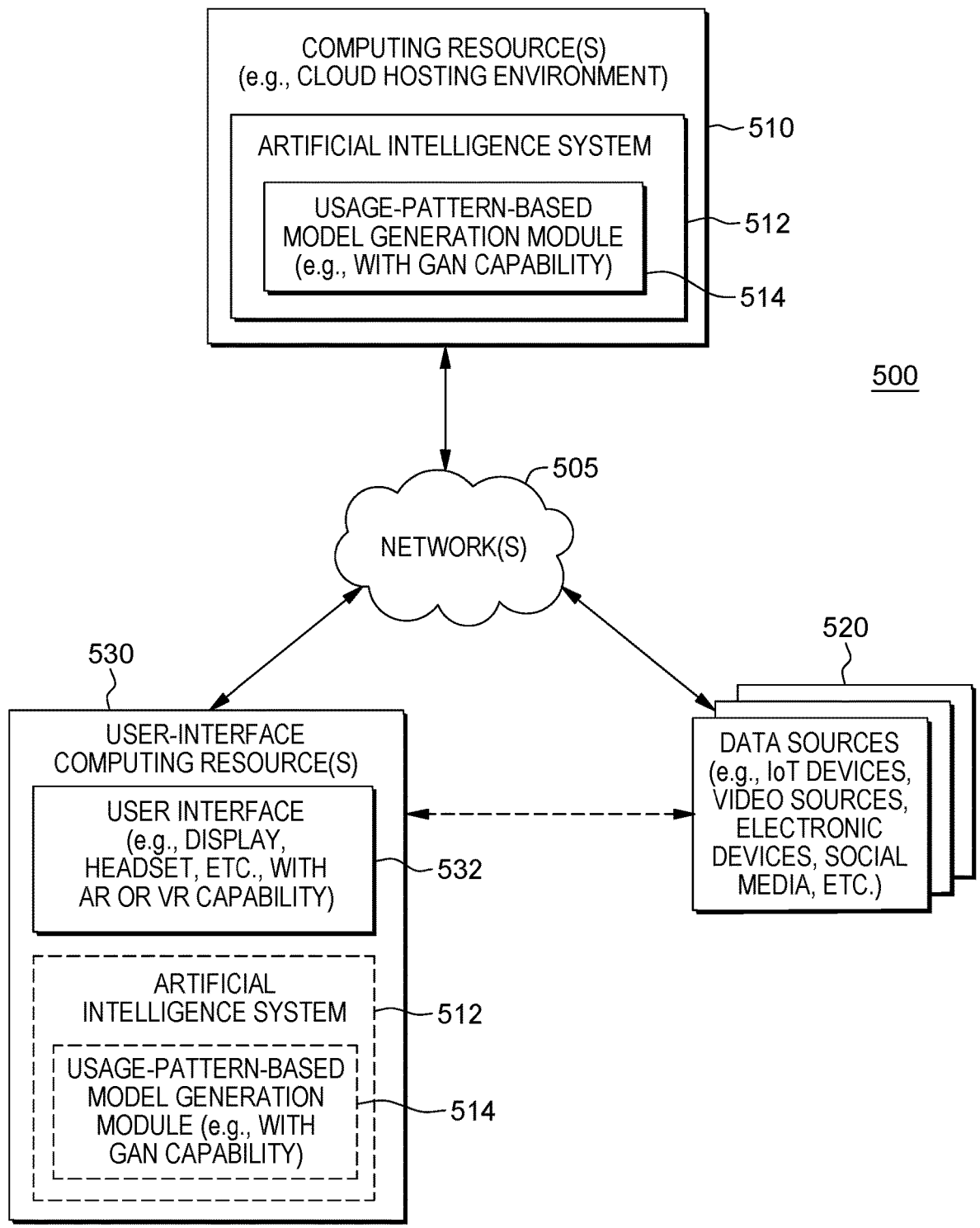
FIG. 5 is another example of a computing environment to include and/or use one or more aspects of the present invention.

FIG. 5 depicts another embodiment of a technical environment or system into which various aspects of some embodiments of the present invention can be implemented. By way of example, computing system 500 can incorporate, or implement, one or more aspects of an embodiment of the present invention. In one or more implementations, system 500 is implemented as part of a computing environment, such as computing environment 100 described above in connection with FIG. 1. Computing system 500 includes one or more computing resources 510, such as one or more cloud-hosting computing resources, that execute program code that implement, for instance, an artificial intelligence system 512 incorporating a usage-pattern-based model generation module 514, such as disclosed herein. In one or more embodiments, usage-pattern-based model generation module 514 can include a generative adversarial network capability to facilitate generating 3-D virtual images and/or digital models, in accordance with the model generation processes disclosed herein.

As noted, in one or more embodiments, the usage-pattern-based model generation processing includes obtaining a usage pattern for a user of a product, where the usage pattern includes a set of usage pattern parameters. In one embodiment, computing system 500 also includes one or more data sources 520, as well as one or more user-interface computing resources 530 operatively coupled to and in communication with computing resource(s) 510 via one or more networks 505. Network(s) 505 can be, for instance, a telecommunications network, a local area network (LAN), a wide-area network (WAN), such as the Internet, or a combination thereof, and can include wired, wireless, fiber-optic connections, etc. The network(s) 505 can include one or more wired and/or wireless networks that are capable of receiving and transmitting data, including usage-pattern-related data, as well as 3-D virtual image-related data, digital model-related data, etc., as need to facilitate the usage-pattern-based model generation processing disclosed.

In one or more embodiments, user-interface computing resource(s) 530 can include a user interface, such as a display, headset, etc., with (for instance) augmented reality (AR) or virtual reality (VR) capability 532 to facilitate displaying one or more 3-D virtual images of a product aligned with the usage pattern of the user of the product. For instance, in one or more implementations, the user of the product can manipulate the virtual product to illustrate a usage pattern of the product, with the user's usage pattern being detected via, for instance, one or more data sources 520, such as one or more Internet of Things (IoT) devices, one or more video sources, one or more electronic devices, etc. In one or more implementations, online data sources, such as social media, can also be used to augment or to obtain the user's usage pattern of a product; for instance, based on prior usage of a similar product.

For illustrative purposes only, artificial intelligence system 512 with user-pattern-based model generation module 514 is depicted as executing on computing resource(s) 510 separate from user-interface computing resource(s) 530. This a non-limiting example of an implementation. In one or more other embodiments, artificial intelligence system 512, with usage-pattern-based model generation module 514, can be (or at least in part be) implemented in association with user-interface computing resource(s) 530, as an example.

Those skilled in the art will note from the description provided herein that a number of novel aspects are disclosed in association with the artificial intelligence system, and usage-pattern-based model generation module and process disclosed. For instance, in one or more implementations, a usage pattern can be obtained by usage training through user interaction with a virtual product. In one example, the user interacts with the virtual product (e.g., in augmented reality or virtual reality) to explain the user's usage requirement for the product. Based on this user interaction with the virtual product, the usage-pattern-based model generation process determines, monitors or otherwise obtains relative movement of different 3-D points of the virtual product to identify how shape and dimension of the virtual product change during use of the product by the user. In one or more implementations, a machine learning model, such as a generative adversarial network, is used to create a sequence of 3-D virtual images of the user's use of the product for requirement analysis.

In one or more embodiments, a requirement specification is derived by the system from the usage pattern-based information. For instance, based on generation of a sequence of 3-D virtual image frames aligned with the user's interaction with the virtual product, the artificial intelligence system ascertains the movement patterns of the product and derives a requirement specification for the product, based on the user's usage pattern. In one or more embodiments, this can include comparing the user's usage pattern with usage patterns of one or more other users and the products designed based thereon.

In one or more embodiments, the artificial intelligence system further compares a rate of change in shape and dimension of the virtual product during the user's use, and accordingly identifies appropriate materials for the development of the new product for the user, that is, appropriate materials to satisfy the requirement specification for the product based on the usage pattern of the user. In one embodiment, the artificial intelligence system can analyze images, IoT data, user movements, etc., obtained while the user is explaining how the product is to be used, or showing how the product is to be used, by interacting with the virtual product. In this manner, the system identifies one or more types of movement requirements for the product, and accordingly, estimates how much force will be applied on the product, so that appropriate material can be selected when identifying or developing the product for fabrication.

In one or more embodiments, the artificial intelligence system is configured with one or more machine learning models to facilitate redrawing the virtual product to generate a digital model of a new product for the user which is based on the identified requirement specification for the user. In one embodiment, the one or more machine learning models can be one or more generative adversarial networks that are able to consider available properties of raw materials, feasibility of usage parameters, etc., to generate a digital model of a new product customized to the user's usage pattern, and to present the digital model as a virtual image of the new product to the virtual interface in order to show the user the final product, which satisfies the user's usage requirement. In one or more embodiments, the artificial intelligence system can consider environmental parameters, physically or virtually, so that the user's usage pattern of the product can be gathered while the product is used, either virtually or physically.

Figure 6:
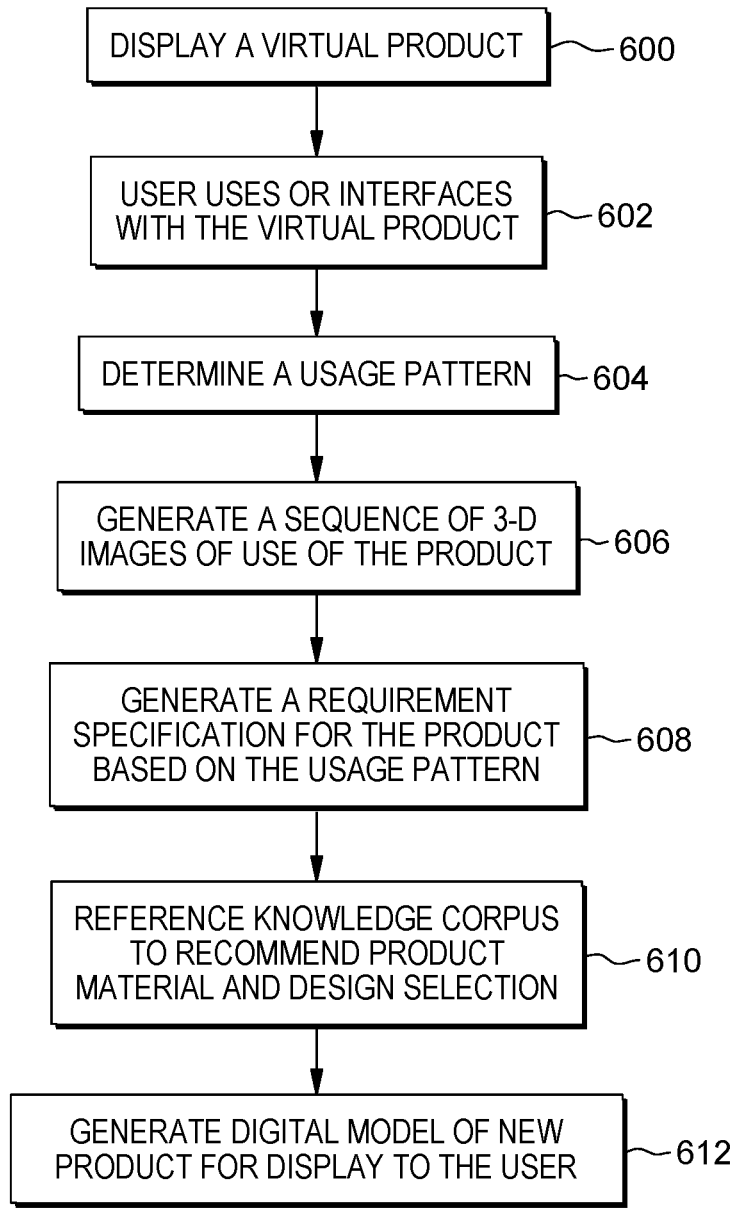
FIG. 6 depicts another example of a usage-pattern-based model generation workflow, in accordance with one or more aspects of the present invention.

By way of example, FIG. 6 depicts another embodiment of a usage-pattern-based model generation workflow, in accordance with one or more aspects of the present invention. In this implementation, a user is presented with a display of a virtual product 600. The user uses (or interfaces with) the virtual product 602 to show or describe how the product will be used by the user, and based on that input, the artificial intelligence system obtains a usage pattern 604 for the user's use of the virtual product. The usage pattern can be obtained by, for instance, monitoring the user's use or interaction with the virtual product to generate a sequence of 3-D virtual images of the use of the product by the user 606. In one or more implementations, generation of a 3-D virtual image is enabled via a machine learning model of the artificial intelligence system, such as one or more generative adversarial networks.

By way of example, in one embodiment, the user illustrates various usage requirements or patterns of the product by interacting with the virtual product. The artificial intelligence system (e.g., the generative adversarial network (GAN) enabled system) monitors the various usage movements to obtain the pattern from, for instance, user gestures, one or more user-wearable devices, visual analysis of the user, etc. Note that, in one or more other implementations, the process can include providing an actual product with sensors that may be, for instance, worn or used by the user, to illustrate the user's usage pattern of the product.

In one embodiment, a requirement specification for the product based on the usage pattern is generated by the artificial intelligence system by, for instance, analyzing the 3-D virtual images of the product representative of the user's usage pattern 608. In one implementation, the artificial intelligence system can reference a knowledge corpus to obtain a material specification for one or more aspects of the product in order to recommend product material and design selection 610. Based on available material properties, the artificial intelligence system identifies (in one embodiment) whether the usage pattern is feasible, and the identified requirement specification for the product for the user is used to generate a digital model of the new product for display to the user 612. In one example, the digital model can be a digital virtual model of the new product which is displayed via an AR or VR interface to the user.

Advantageously, an artificial intelligence system with usage-pattern-based model generation processing, in accordance with one or more aspects of the present invention, allows a user to readily explain usage of any product to the system, including manually or verbally, since virtual or augmented reality simulation is used to facilitate the user's explanation of how the product is to be used. In one or more embodiments, the artificial intelligence system is used to identify a requirement specification for the product based on the user's usage pattern. For instance, in one embodiment, the artificial-intelligence-enabled system can identify relevant parameters in terms of product shape and dimension, and how changes can happen to the product during usage.

In one or more implementations, the artificial intelligence system with usage-pattern-based model generation processing identifies appropriate materials to be used for manufacture of the new product, or for modifying an existing product, based on the identified usage pattern, or requirement specification for the product. Further, in one embodiment, in addition to identifying material selection details, the artificial intelligence system can provide a cost estimate for the materials, as well as for the new product, if desired.

In one or more implementations, the artificial intelligence system utilizes one or more machine learning models to, for instance, generate the 3-D virtual images, including the resultant digital model of the new product. In one implementation, the machine learning model is, or includes, a generative adversarial network (GAN) used for image generation. The GAN can be used to create a high-fidelity image of the new product with a virtual interface, which facilitates the user's experience in visualizing the final product before, for instance, the product is fabricated.

In one or more embodiments, Internet of Things (IoT) device data or other sensor data can be used to assist the usage-pattern-based model generation workflow. For instance, IoT and other sensor feeds can be used by the artificial intelligence system to assist in identifying various parameters, such as force applied on the product, time period of usage of the product, etc., based on the user's usage of the product, the artificial intelligence system can further refine the product by considering all such parameters.

In one embodiment, the artificial intelligence system, for instance, the GAN, generates a digital model of the new product for display to the user as a virtual product with rendered images, which the user can use for further analysis and/or modification, if desired. Availability of source code and computer-aided design data provides additional advantages to the user for redesigning or modifying the generated digital model of the new product, if desired.

Since the artificial intelligence system with usage-pattern-based model generation processing disclosed herein offers high flexibility to end-users for product usage specification, the system can also be used as part of a requirement gathering process during a design phase of a new product development cycle. Using generative adversarial network-based 3-D digital modeling, the processing disclosed also ensures availability of high-fidelity product requirement specifications for design and/or modification purposes.

In one or more embodiments, the usage-pattern-based model generation facility disclosed herein facilitates multiple stages of product development, including, for instance, visualization of product rendering, user requirement gathering, material and design selection, as well as rendering of product prototype.

Visualization and product rendering can include facilitating rendering of any product, such as an apparel product, shoes, furniture, or other product which can change shape, dimension, and/or orientation during usage by a user. The product can be visualized in a user interface, such as in an AR interface, holographic interface, VR interface, etc., which allows for a virtual image to be displayed. In one or more embodiments, the user uses the virtual product to perform different types of movements or to show different types of usage patterns. While doing so, the time period for every movement or usage pattern can be noted by the artificial intelligence system. Further, in one or more embodiments, the user can wear one or more wearable devices, or use an external gesture monitoring system to assist with monitoring the usage pattern of the product by the user. The system can also use object tracking to track the usage pattern, in one or more embodiments.

Once the system has received or obtained the user's usage pattern of the product, the data is used to generate, in one embodiment, parameters for product dimension change, orientation change, etc., based on which the product can be modified or a new product can be developed to meet the user's usage pattern requirements. For instance, in one embodiment, the artificial intelligence system knows the 3-D shape of the product, and is identifying the user's usage pattern. The system identifies, in one embodiment, 3-D points for the product, and considers how the user is using the product, such as pressure applied by the user on the product for each 3-D point, etc. In one implementation, the artificial intelligence system tracks the time period usage for every 3-D point, and identifies the actual dimension change at every point using, for instance, existing reference knowledge about how much distance should be covered during a unit time interval. In one implementation, the system identifies how the 3-D points are changing during usage of the product by the user. In one or more embodiments, the artificial intelligence system with usage-pattern-based model generation processing disclosed herein can identify one or more of the following: how much pressure is applied by the user to the product during a usage interval; what orientation changes with respect to a horizontal or vertical level of the product occur during usage by the user; how much movement is applied to the product by the user; how often, or how many times, the movement is applied by the user; etc. In one or more embodiments, the generated 3-D images of the usage pattern of the product are analyzed by the artificial intelligence system to identify the requirement specification for the product based on the user's usage pattern.

In one or more embodiments, the artificial intelligence system has access to, or includes, a knowledge corpus identifying available materials and their properties for the product, as well as where the different materials can be used within the product. The artificial intelligence system analyzes the generated virtual images to identify how the product is used, as well as the material behavior under different usage patterns. Based on an historically-created knowledge corpus about prior product usage, the artificial intelligence system further estimates how much force will be applied on the product, and the direction of the applied force based on the user's usage pattern. By identifying the usage pattern, such as from one or more existing or generated images representative of the usage pattern, the artificial intelligence system can identify what types of materials should be selected for the product. In one embodiment, identifying the types of materials to be used for the product allows the product to be depicted based on the usage requirement of the user. In one example, material is selected based on the user's usage pattern of the product, and understanding how much force is to be applied by the user on the product during its use. The artificial intelligence system is configured to identify which material is best suited for the required application. For example, a selected material may be a hard plastic for a high range of force, and the artificial intelligence system can be configured to generate or use existing images to identify which region of the product requires, generates, or receives more pressure during product use, and hence can be selected for a more rigid material. Similarly, where a large movement is applied to the product, the artificial intelligence system can be configured to use the generated or received images to identify one or more product regions which may require use of a more elastic material based on the applied movement.

As noted, in one or more embodiments, the artificial intelligence system generates a digital model of the new product for the user based on the identified requirement specification. In one implementation, this can involve redrawing the 3-D virtual image of the product to show the final shape, dimension and appearance of the product based on the user's usage pattern. For instance, in one embodiment, the artificial intelligence system can map the generated image with dimensions and material specifications based on the usage pattern in order to generate the digital model with the appropriate shape and dimensions of the product. For example, where the artificial intelligence system identifies that the user often applies pressure on the top portion of a product during use, then the system can show an upward direction push or force applied by the user in rendering the digital model of the new product. In addition, in one embodiment, the artificial intelligence system with usage-pattern-based model generation processing such as disclosed can be configured to illustrate to the user any aspect of the requirement specification that is not feasible for product production, so that the user can understand which requirements can be satisfied in the product, and which may not be available in the final product.

Figure 7:
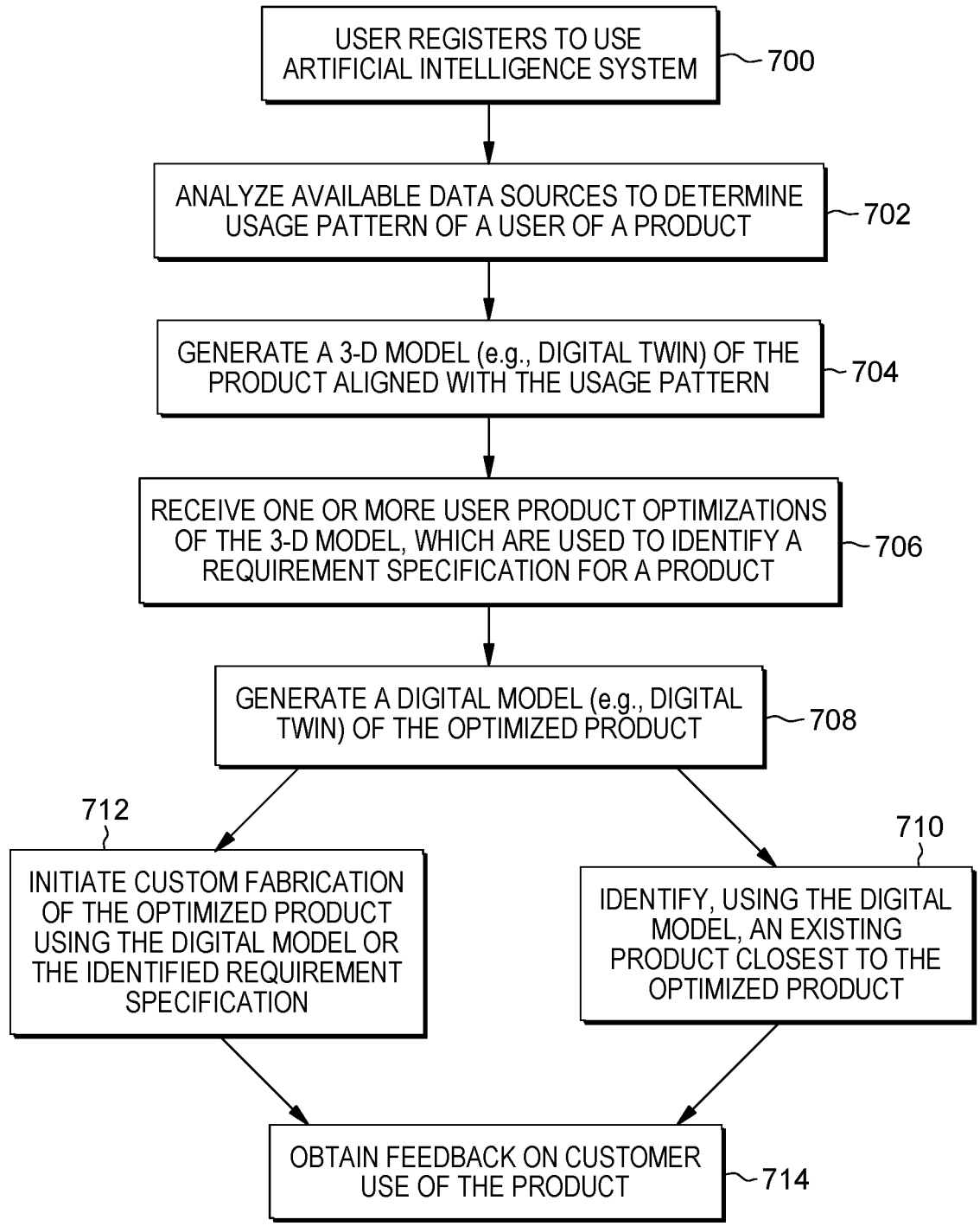
FIG. 7 depicts a further example of a usage-pattern-based model generation workflow, in accordance with one or more aspects of the present invention.

By way of further example, FIG. 7 depicts another embodiment of a usage-pattern-based model generation workflow, in accordance with one or more aspects of the present invention. In this implementation, a user initially registers or opts in to use the artificial intelligence system 700. For instance, in one or more implementations, a usage-pattern-based model generation facility such as disclosed herein can include code to facilitate registering a user with the artificial intelligence system to receive permission from the user for data collection. To the extent one or more implementations of the invention collect, store, or employ personal information provided by, or obtained from, an individual user (for example, user product-related data), such information shall be used in accordance with all applicable laws concerning protection of personal information. Additionally, the collection, storage, and use of such information can be subject to consent of the individual to such activity, for instance, through "opt-in" or "opt-out" processes, as may be appropriate for the situation and type of information. Storage and use of personal information can be in an appropriately secure manner, reflective of the type of information, for instance, through various encryption and anonymization techniques for sensitive information.

As illustrated in FIG. 7, the system workflow further includes, in one embodiment, analyzing available data sources to determine usage pattern of a user of a product 702. For instance, available data sources can be analyzed by the system to gather, parse and define particular product components and features that will match the user's anticipated usage pattern, and expectations, to facilitate generate the digital model. In one or more embodiments, the digital model can be a digital twin of the optimal product for the user.

For instance, in one or more embodiments, the user's social media can be examined by the artificial intelligence system for images of a similar product in use, with the system using natural language processing (NLP) and/or natural language understanding (NLU) to facilitate capturing text comments from captions, or comments that express satisfaction or issues with various product specifics or features. If an image has location tags, the location can further be used to determine environmental factures common at that particular location. Additionally, weather conditions under which a product is to be used can be detected via available edge detection algorithms. Additionally, in one or more embodiments, the user's product history can be analyzed by the artificial intelligence system to identify particular characteristics and features of, for instance, a particular brand and model of product previously purchased, the length of time the product was in use by the user, etc. If a review of the prior product was provided by the user, then NLP, NLU, and/or Bag-of-Words algorithms can be used to extract which product features met or did not meet the user's expectations. In addition, further images may be available on the user's computing resources, for instance, electronic devices, not otherwise posted on social media, that can contain depiction of a specific product and use. In such case, the artificial intelligence system can use an object detection algorithm to identify images containing a matching product, and if there are multiple images taken at different points in time with sufficient resolution, the system can determine and wear on the product experienced over the time period between images. This information can be valuable in determining if the prior product is deteriorating slower or faster than expected with typical usage of the product, which can provide an indication of a heavier than normal usage pattern, or conditions that require higher quality or more resilient materials in the new product. In addition, in order to provide direct and specific feedback, the system can accept, in one embodiment, a user providing a real-time video of the user's use of the product, and then using AR or touch-screen interaction, allow the user to indicate particular issues with one or more product components. Further, the system can correlate any audio or video points, and using a Bag-of-Words algorithm, determine the particular components that the user is or is not satisfied with.

As illustrated in FIG. 7, in one or more implementations, the artificial intelligence system workflow includes generating a 3-D model (e.g., a digital twin) of the product aligned with the usage pattern 704. In one embodiment, the digital twin is of a product that can address all of the user requirements and the user's feedback gathered by the system. One or more user product optimizations of the 3-D model can be received by the system, which are then used to identify or refine the requirement specification for the product 706. For instance, in one embodiment, the system may provide the user with the ability to customize color, shape, or other features of the product. A digital model (e.g., digital twin) of the optimized product is generated 708, which can be compared with, for instance, digital twin models of existing products, to determine whether an existing product may be close to the requirement specification of the user of the product 710. If no existing product closely matches the specification requirement, then in one embodiment, the user is provided with the option for the system to upload the digital twin model to a fabricator which can custom-build the product to the specifications of the digital twin model for shipping to the user 712. In one embodiment, as the user is using the product, further feedback can be provided to the artificial intelligence system to identify, for instance, which areas of the product may require improvement in design for a next iteration of a similar product in the future 714.

As a specific example, assume that a user is looking to obtain a new mountain bike, where the user is having to repeatedly replace the wheels of their current bike. As part of the workflow, the artificial intelligence system can scan the registered user's social media feeds, and locate one or more images showing the user's current mountain bike and any related text comments. From the images, the artificial intelligence system can determine, for instance, the make and model of the current bike, that the bike is being used on mountain trails, as well as the location and weather conditions when the bike is being used. The artificial intelligence system can scan any reviews left by the user after the user had purchased the prior bike, and adjust the review sentiment if necessary. For instance, where the system scans a review left right after the user purchased the existing bike, then a positive sentiment can be lowered in weight, as it may not have covered sufficient length of time of usage under different scenarios. That is, the text may have been uploaded prior to the user's use of the bike heavily.

In one or more implementations, the artificial intelligence system is able to find other images that also indicate issues not only with the wheels, but also the tires wearing down quicker than usual. Additionally, the artificial intelligence system finds images of the bike being used in extreme conditions, so it determines that the new model will need to be made of materials more resilient to water and rusting. The artificial intelligence system therefore modifies the specifications on the wheels to, for instance, carbon fiber rather than steel. Once the requirement specification for the user's product is obtained, the system defines a new digital twin model of the bike with all the specifications matching the ascertained user requirements. If the system cannot locate an existing product that matches these requirements, then the digital twin model can be uploaded to, for instance, a custom bike manufacturer for fabrication.

In one or more implementations, an artificial-intelligence-based method and system are provided herein which include, for instance: obtaining a usage pattern of a product by a user, using virtual or augmented reality, such as based on physical gestures made by the user interfacing with the virtual product. The user's gestures can be tracked using, for instance, wearable devices, IoT devices, etc. In implementation, the usage pattern can be represented by relative movement of different 3-D points of the product. Based on usage pattern, the artificial-intelligence-enabled system identifies relevant parameters in terms of product shape and product dimension, and how the product shape and dimension change during use. Based on the user's usage pattern, the system also can identify materials to be used for manufacturing the product, and if desired, a cost estimate for manufacturing the product, where the product can be a new product or an existing product. Based on the user's usage pattern, the system can also generate a sequence of 3-D images of the product aligned with the usage pattern. For instance, in one embodiment, a generative adversarial network can be used to generate the 3-D images. The artificial intelligence system can then derive a usage requirement specification for the product based on the usage pattern, the component materials identified, the relevant parameters identified, and/or the cost estimation for the materials. In one implementation, the artificial intelligence system can redraw the product using, for instance, a generative adversarial network (based on the usage requirement specification) to obtain a final product, and present the final product to the user as a digital model in virtual or augmented reality.

Those skilled in the art will note from the description provided herein that, in one aspect, a computer-implemented method of facilitating processing within a computing environment is provided. The computer-implemented method includes: obtaining a usage pattern of a user of a product, where the usage pattern includes a set of usage pattern parameters. Further, the method includes using a machine learning model of an artificial intelligence system to generate a 3-D virtual image of the product aligned with the usage pattern, and analyzing, by the artificial intelligence system, the 3-D virtual image of the product to facilitate identifying a requirement specification for the product based on the usage pattern. In addition, the method includes generating, by the artificial intelligence system, a digital model of a new product for the user based on the identified requirement specification. Advantageously, improved product development processing within a computing environment is provided. The improved processing includes a process for usage-pattern-based generation of a digital model which facilitates customized product development, optimized to a particular user's usage pattern of the product. The customized development promotes user satisfaction with the product, as well as sustainability by designing, and selecting or fabricating, the product to best meet the user's usage pattern.

In one implementation, obtaining the usage pattern of the user of the product includes determining a usage pattern of the user of a virtual product representative of the product, where the determining is based on data from one or more electronic devices, the data being representative of user movement of the virtual product, and the usage pattern including, for example, relative movement of different 3-D points of the virtual product. Advantageously, determining the usage pattern of a user of a virtual product representative of the product is a cost effective and efficient approach to providing the artificial intelligence system with the user's usage pattern.

In one example, the machine learning model is a generative adversarial network. Advantageously, the use of generative adversarial network-based 3-D virtual image rendering facilitates obtaining a high-fidelity virtual product, which assists with identifying the requirement specification for the product based on the usage pattern.

In one implementation, the 3-D virtual image of the product aligned with the usage pattern generated by the machine learning model of the artificial intelligence system is one 3-D virtual image of a sequence of 3-D virtual images of the product aligned with the usage pattern that are generated by the machine learning model of the artificial intelligence system, and the analyzing includes analyzing, by the artificial intelligence system, the sequence of 3-D virtual images of the product to facilitate identifying the requirement specification for the product based on the usage pattern. Advantageously, obtaining a sequence of 3-D virtual images of the product aligned with the usage pattern, which are generated by the machine learning model of the artificial intelligence system, assists the artificial intelligence system in analyzing the user's usage pattern input to facilitate identifying the requirement specification for the product based on the usage pattern.

In one embodiment, identifying the requirement specification for the product based on the usage pattern includes identifying, by the artificial intelligence system, data representing one or more relevant parameters of the product's shape and dimensions of the product, and how the shape and dimensions of the product change during use by the user. In one example, identifying the requirement specification for the product based on the usage pattern further includes identifying, by the artificial intelligence system, one or more materials to be used in manufacture of the new product based on a rate of change in shape and dimension of the product during use by the user. Advantageously, through analyzing the 3-D virtual image of the product, the artificial intelligence system identifies a requirement specification for the product based on the usage pattern, where the requirement specification can include multiple product parameters, including, for instance, product shape and dimension, and how shape and dimension change during usage of the product. Based on the requirement specification, the artificial intelligence system can identify appropriate materials, for instance, from a knowledge corpus, to be used for manufacturing a new product, or modifying an existing product that meets the user's usage pattern for the product.

In one implementation, the computer-implemented method further includes providing the digital model of the new product to a virtual display interface for display to the user as a virtual new product. Advantageously, display of the virtual new product to the user by a virtual display interface enhances the artificial intelligence system experience for the user by allowing the user to visualize the final product before fabrication.

In one implementation, the set of usage pattern parameters includes parameters for: force applied on the product during use; one or more time periods of movement of the product during use; product dimension changes during use; and product orientation changes during use. Advantageously, a variety of usage pattern parameters are obtained by the artificial intelligence system in order to identify an optimum requirement specification for the product for the usage pattern of the user. In one embodiment, electronic devices, such as Internet of Things (IoT) and other sensors can feed data to the artificial intelligence system, such as force applied on the product, time period of usage, etc., which assists the artificial intelligence system in refining the requirement specification for the product based on the user's usage pattern.

In one embodiment, determining the usage pattern of the product for the user includes receiving a user-explanation of how the product is to be used, and parsing, by the artificial intelligence system, the user-explanation to determine the usage pattern for the user of the product. Advantageously, the artificial intelligence system is configured to readily allow the user to provide an explanation of how the product is to be used, which can then be parsed by the artificial intelligence system to determine the usage pattern for the user of the product.

In one embodiment, obtaining the usage pattern of the product for the user includes obtaining and analyzing, by the artificial intelligence system, product-relevant user data from available online data sources to determine the usage pattern of the product for the user. Advantageously, obtaining the usage pattern of the user of the product can be achieved in one or more ways, including by the artificial intelligence system analyzing product-relevant user data from available online data sources.

In one implementation, the generated 3-D virtual image of the product aligned with the usage pattern is a digital twin of a product design that addresses the usage pattern, and which the user can further optimize for use in identifying the requirement specification. Advantageously, a digital twin is a virtual model designed to accurately reflect the physical object. The digital twin is a virtual representation of the product and can be used to simulate use of the product.

In another aspect, a computer system for facilitating processing within a computing environment is provided. The computer system includes a memory, and at least one processor in communication with the memory. The computer system is configured to perform a method, which includes obtaining a usage pattern of a user of a product, where the usage pattern includes a set of usage pattern parameters, and using a machine learning model of an artificial intelligence system to generate a 3-D virtual image of the product aligned with the usage pattern. Further, the method includes analyzing, by the artificial intelligence system, the 3-D virtual image of the product to identify a requirement specification for the product based on the usage pattern, and generating, by the artificial intelligence system, a digital model of a new product for the user based on the identified requirement specification.

In a further aspect, a computer program product for facilitating processing within a computing environment is provided. The computer program product includes one or more computer-readable storage media and program instructions collectively stored on the one or more computer-readable storage media to perform a method, which includes obtaining a usage pattern of a user of a product, where the usage pattern includes a set of usage pattern parameters, and using a machine learning model of an artificial intelligence system to generate a 3-D virtual image of the product aligned with the usage pattern. Further, the method includes analyzing, by the artificial intelligence system, the 3-D virtual image of the product to identify a requirement specification for the product based on the usage pattern, and generating, by the artificial intelligence system, a digital model of a new product for the user based on the identified requirement specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

obtaining a usage pattern of a user to facilitate design of a physical product, the usage pattern comprising a set of usage pattern parameters;

using a machine learning model of an artificial intelligence system to generate a 3-D virtual image of the physical product aligned with the usage pattern;

analyzing, by the artificial intelligence system, the 3-D virtual image of the physical product to facilitate identifying a requirement specification for the design of the physical product based on the usage pattern; and generating, by the artificial intelligence system, a digital model of a new physical product for the user based on the identified requirement specification for the design of the physical product.

2. The computer-implemented method of claim 1, wherein obtaining the usage pattern of the user to facilitate design of the physical product comprises determining the usage pattern of the user of a virtual product representative of the physical product, the determining being based on data from one or more electronic devices, the data being representative of user movement of the virtual product, and the usage pattern including relative movement of different 3-D points of the virtual product.

3. The computer-implemented method of claim 2, wherein the machine learning model is a generative adversarial network.

4. The computer-implemented method of 2, wherein the 3-D virtual image of the physical product aligned with the usage pattern generated by the machine learning model of the artificial intelligence system is one 3-D virtual image of a sequence of 3-D virtual images of the physical product aligned with the usage pattern that are generated by the machine learning model of the artificial intelligence system, and wherein the analyzing comprises analyzing, by the artificial intelligence system, the sequence of 3-D virtual images of the physical product to facilitate identifying the requirement specification for the design of the physical product based on the usage pattern.

5. The computer-implemented method of claim 4, wherein identifying the requirement specification for the design of the physical product based on the usage pattern includes identifying, by the artificial intelligence system, physical product data representing one or more relevant parameters of a shape and dimensions of the new physical product, and how the shape and dimensions of the new physical product change during use by the user.

6. The computer-implemented method of claim 5, wherein identifying the requirement specification for the design of the physical product based on the usage pattern further includes identifying, by the artificial intelligence system, one or more materials to be used in manufacture of the new physical product based on a rate of change in the shape and dimensions of the design of the physical product during use by the user.

7. The computer-implemented method of claim 1, further comprising providing the digital model of the new physical product to a virtual display interface for display to the user as a virtual new product.

8. The computer-implemented method of claim 1, wherein the set of usage pattern parameters comprise parameters for:
force applied on the product during use;
one or more time periods of movement of the product during use;
product dimension changes during use; and
product orientation changes during use.

9. The computer-implemented method of claim 1, wherein obtaining the usage pattern of the physical product for the user to facilitate design of the physical product includes receiving a user-explanation of how the product is to be used, and parsing, by the artificial intelligence system, the user-explanation to determine the usage pattern for the user of the product.

10. The computer-implemented method of claim 1, wherein obtaining the usage pattern of the physical product for the user to facilitate design of the physical product comprises obtaining and analyzing, by the artificial intelligence system, product-relevant user data from available online data sources to determine the usage pattern of the product for the user.

11. The computer-implemented method of claim 1, wherein the generated 3-D virtual image of the physical product aligned with the usage pattern is a digital twin of a physical product design that addresses the usage pattern, and which the user can further optimize for use in identifying the requirement specification.

12. A computer system for facilitating processing within a computing environment, the computer system comprising:
a memory; and
at least one processor in communication with the memory, wherein the computer system is configured to perform a method, said method comprising:
obtaining a usage pattern of a user to facilitate design of a physical product, the usage pattern comprising a set of usage pattern parameters;
using a machine learning model of an artificial intelligence system to generate a 3-D virtual image of the physical product aligned with the usage pattern;
analyzing, by the artificial intelligence system, the 3-D virtual image of the physical product to facilitate identifying a requirement specification for the design of the physical product based on the usage pattern; and
generating, by the artificial intelligence system, a digital model of a new physical product for the user based on the identified requirement specification for the design of the physical product.

13. The computer system of claim 12, wherein obtaining the usage pattern of the user to facilitate design of the physical product comprises determining the usage pattern of the user of a virtual product representative of the physical product, the determining being based on data from one or more electronic devices, the data being representative of user movement of the virtual product, and the usage pattern including relative movement of different 3-D points of the virtual product, and wherein the machine learning model is a generative adversarial network.

14. The computer system of claim 13, wherein the 3-D virtual image of the physical product aligned with the usage pattern generated by the machine learning model of the artificial intelligence system is one 3-D virtual image of a sequence of 3-D virtual images of the physical product aligned with the usage pattern that are generated by the machine learning model of the artificial intelligence system, and wherein the analyzing comprises analyzing, by the artificial intelligence system, the sequence of 3-D virtual images of the physical product to facilitate identifying the requirement specification for the design of the physical product based on the usage pattern.

15. The computer system of claim 14, wherein identifying the requirement specification for the design of the physical product based on the usage pattern includes identifying, by the artificial intelligence system, physical product data representing one or more relevant parameters of a shape and dimensions of the new physical product, and how the shape and dimensions of the new physical product change during use by the user.

16. The computer system of claim 15, wherein identifying the requirement specification for the design of the physical product based on the usage pattern further includes identifying, by the artificial intelligence system, one or more materials to be used in manufacture of the new physical product based on a rate of change in the shape and dimensions of the design of the physical product during use by the user.

17. The computer system of claim 12, wherein the generated 3-D virtual image of the physical product aligned with the usage pattern is a digital twin of a physical product design that addresses the usage pattern and which the user can further optimize for use in identifying the requirement specification.

18. A computer program product for facilitating processing within a computing environment, the computer program product comprising:
  one or more non-transitory computer-readable storage media and program instructions collectively stored on the one or more non-transitory computer readable storage media to perform a method comprising:
  obtaining a usage pattern of a user to facilitate design of a physical product, the usage pattern comprising a set of usage pattern parameters;
  using a machine learning model of an artificial intelligence system to generate a 3-D virtual image of the physical product aligned with the usage pattern;
  analyzing, by the artificial intelligence system, the 3-D virtual image of the physical product to facilitate identifying a requirement specification for the design of the physical product based on the usage pattern; and
  generating, by the artificial intelligence system, a digital model of a new physical product for the user based on the identified requirement specification for the design of the physical product.

19. The computer program product of claim 18, wherein obtaining the usage pattern of the user to facilitate design of the physical product comprises determining the usage pattern of the user of a virtual product representative of the physical product, the determining being based on data from one or more electronic devices, the data being representative of user movement of the virtual product, and the usage pattern including relative movement of different 3-D points of the virtual product, and wherein the machine learning model is a generative adversarial network.

20. The computer program product of claim 19, wherein identifying the requirement specification for the design of the physical product based on the usage pattern includes identifying, by the artificial intelligence system, physical product data representing one or more relevant parameters of a shape and dimensions of the new physical product, and how the shape and dimensions of the new physical product change during use by the user.

* * * * *